United States Patent
Liu

(10) Patent No.: US 11,160,042 B2
(45) Date of Patent: Oct. 26, 2021

(54) INFORMATION DETERMINING METHOD AND APPARATUS, ELECTRONIC DEVICE, AND COMPUTER READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 93 days.

(21) Appl. No.: 16/633,737

(22) PCT Filed: Jul. 31, 2017

(86) PCT No.: PCT/CN2017/095148
§ 371 (c)(1),
(2) Date: Jan. 24, 2020

(87) PCT Pub. No.: WO2019/023839
PCT Pub. Date: Feb. 7, 2019

(65) Prior Publication Data
US 2020/0213959 A1 Jul. 2, 2020

(51) Int. Cl.
*H04W 56/00* (2009.01)
*H04W 72/04* (2009.01)
*H04W 72/00* (2009.01)

(52) U.S. Cl.
CPC ....... *H04W 56/001* (2013.01); *H04W 72/005* (2013.01); *H04W 72/0446* (2013.01); *H04W 72/0453* (2013.01)

(58) Field of Classification Search
CPC ............. H04W 56/001; H04W 72/005; H04W 72/0446; H04W 72/0453
See application file for complete search history.

(56) References Cited

U.S. PATENT DOCUMENTS

| 2018/0159926 A1* | 6/2018 | Sun | H04W 88/04 |
| 2019/0356524 A1* | 11/2019 | Yi | H04W 48/16 |
| 2020/0236679 A1* | 7/2020 | Zhou | H04L 5/0053 |

FOREIGN PATENT DOCUMENTS

| CN | 105430658 A | 3/2016 |
| CN | 105979597 A | 9/2016 |

(Continued)

*Primary Examiner* — Melvin C Marcelo
(74) *Attorney, Agent, or Firm* — Syncoda LLC; Feng Ma

(57) ABSTRACT

An information determining method includes: receiving synchronization block groups in an information transmission frequency band; determining a first frequency sub-band where a first synchronization block group is located, and determining first frequency-domain distribution information and first time-domain distribution information; determining a second frequency sub-band where a control resource set is located, calculating number of frequency sub-bands between the second frequency sub-band and the first frequency sub-band, and calculating a frequency-domain offset of a second synchronization block group in the second frequency sub-band relative to the first synchronization block group according to the number and the bandwidths of the frequency sub-bands; determining second frequency-domain distribution information of the second synchronization block group according to the offset and the first frequency-domain distribution information; determining the control resource set, and determining remaining key information according to control information in the control resource set.

20 Claims, 8 Drawing Sheets

(56) References Cited

FOREIGN PATENT DOCUMENTS

| | | | |
|---|---|---|---|
| CN | 106231614 A | 12/2016 | |
| CN | 106797611 A | 5/2017 | |
| WO | 2017078841 A | 5/2017 | |

\* cited by examiner

INFORMATION DETERMINING METHOD AND APPARATUS, ELECTRONIC DEVICE, AND COMPUTER READABLE STORAGE MEDIUM

CROSS-REFERENCE TO RELATED APPLICATION

This application is a national stage of International Application No. PCT/CN2017/095148 filed on Jul. 31, 2017, the disclosure of which is hereby incorporated by reference in its entirety.

TECHNICAL FIELD

The present disclosure relates to a field of terminal technology and, more particularly, to an information determining method and apparatus, an electronic device, and a computer readable storage medium.

BACKGROUND

In 5G communication, RMSI (Remaining Essential System Information) carries SIB (System Information Block) used for processes such as ones of random access, and control information used for indicating frequency domain distribution information of RMSI and time domain distribution information of RMSI is included in CORESET (Control Resource Set). Therefore, in order to obtain SIB, it is necessary to determine the control information of frequency domain distribution information of CORESET and time domain distribution information of CORESET to obtain CORESET.

At present, indication information indicating frequency domain distribution information of CORESET and time domain distribution information of CORESET is mainly carried by a synchronization block group in a 5G signal. However, since frequency corresponding to 5G communication is relatively high, for example, the frequency may reach over 6 GHz, a bandwidth of a frequency supported by a User Equipment (UE) at a higher frequency is also relatively larger, for example, the bandwidth may reach 400 M, if only one synchronization block group is set in a frequency band of 400 M, a User Equipment needs to receive the synchronization block group in the frequency band of 400 M. It takes a relatively long time to receive the synchronization block group, which may result in a relatively long time required to obtain a CORESET, leading to a long time required to obtain a SIB, and causing delays and other problems in processes such as ones of random access. Moreover, in a frequency band of 400 M, a frequency domain distribution of a CORESET and a time domain distribution of a CORESET are indicated by indication information, and more bits are occupied.

SUMMARY

In order to overcome problems existing in related art, the present disclosure provides an information determining method and apparatus, an electronic device, and a computer readable storage medium.

According to a first aspect of embodiments of the present disclosure, there is provided an information determining method, including:

receiving synchronization block groups in a frequency band in which information is transmitted, wherein the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

determining, when a first synchronization block group is received, according to indication information in the first synchronization block group, a first frequency sub-band in which the first synchronization block group is located, and determining first frequency domain distribution information and first time domain distribution information of the first synchronization block group in the first frequency sub-band;

determining a second frequency sub-band in which a control resource set is located;

calculating a number of frequency sub-bands between the second frequency sub-band and the first frequency sub-band;

calculating, according to the number and a width of the frequency sub-bands, a quantity of frequency domain offset of a second synchronization block group in the second frequency sub-band relative to the first synchronization block group;

determining, according to the offset and the first frequency domain distribution information, second frequency domain distribution information of the second synchronization block group;

determining, according to the second frequency domain distribution information, the first time domain distribution information, and a preset time domain relationship and a preset frequency domain relationship between the second synchronization block group and the control resource set, frequency domain distribution information and time domain distribution information of the control resource set;

determining the control resource set according to the frequency domain distribution information of the control resource set and the time domain distribution information of the control resource set; and determining remaining key information according to control information in the control resource set.

Optionally, the first synchronization block group carries a physical broadcast channel;

wherein the physical broadcast channel carries the indication information.

Optionally, the first synchronization block group carries a demodulation reference signal;

wherein an orthogonal scrambling code of the demodulation reference signal is the indication information.

Optionally, the determining the first frequency domain distribution information and the first time domain distribution information of the first synchronization block group in the first frequency sub-band includes:

determining, according to the indication information, the first frequency domain distribution information and the first time domain distribution information of the first synchronization block group in the first frequency sub-band.

Optionally, the determining the first frequency domain distribution information and the first time domain distribution information of the first synchronization block group in the first frequency sub-band includes:

determining, according to first pre-stored information, the first frequency domain distribution information and the first time domain distribution information of the first synchronization block group in the first frequency sub-band.

Optionally, the determining the second frequency sub-band in which the control resource set is located includes:

determining, according to the indication information, the second frequency sub-band in which the control resource set is located.

Optionally, the determining the second frequency sub-band in which the control resource set is located includes:

determining, according to second pre-stored information, the second frequency sub-band in which the control resource set is located.

According to a second aspect of embodiments of the present disclosure, there is provided an information determining apparatus, including:

a receiving module, configured to receive synchronization block groups in a frequency band in which information is transmitted, wherein the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

a first distribution determining module, configured to determine, when a first synchronization block group is received, according to indication information in the first synchronization block group, a first frequency sub-band in which the first synchronization block group is located, and determine first frequency domain distribution information and first time domain distribution information of the first synchronization block group in the first frequency sub-band;

a frequency band determining module, configured to determine a second frequency sub-band in which a control resource set is located;

a number calculating module, configured to calculate a number of frequency sub-bands between the second frequency sub-band and the first frequency sub-band;

an offset calculating module, configured to calculate, according to the number and a width of the frequency sub-bands, a quantity of frequency domain offset of a second synchronization block group in the second frequency sub-band relative to the first synchronization block group;

a second distribution determining module, configured to determine, according to the offset and the first frequency domain distribution information, second frequency domain distribution information of the second synchronization block group;

a third distribution determining module, configured to determine, according to the second frequency domain distribution information, the first time domain distribution information, and a preset time domain relationship and a preset frequency domain relationship between the second synchronization block group and the control resource set, frequency domain distribution information and time domain distribution information of the control resource set;

a control resource set determining module, configured to determine the control resource set according to the frequency domain distribution information of the control resource set and the time domain distribution information of the control resource set; and a remaining key information determining module configured to determine remaining key information according to control information in the control resource set.

Optionally, the first synchronization block group carries a physical broadcast channel;

wherein the physical broadcast channel carries the indication information.

Optionally, the first synchronization block group carries a demodulation reference signal;

wherein an orthogonal scrambling code of the demodulation reference signal is the indication information.

Optionally, the first distribution determining module is configured to determine, according to the indication information, the first frequency domain distribution information and the first time domain distribution information of the first synchronization block group in the first frequency sub-band.

Optionally, the first distribution determining module is configured to determine, according to first pre-stored information, the first frequency domain distribution information and the first time domain distribution information of the first synchronization block group in the first frequency sub-band.

Optionally, the frequency band determining module is configured to determine, according to the indication information, the second frequency sub-band in which the control resource set is located.

Optionally, the frequency band determining module is configured to determine, according to second pre-stored information, the second frequency sub-band in which the control resource set is located.

According to a third aspect of embodiments of the present disclosure, there is provided an electronic device, including:

a processor; and a memory configured to store instructions executable by the processor, wherein the processor is configured to:

receive synchronization block groups in a frequency band in which information is transmitted, wherein the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

determine, when a first synchronization block group is received, according to indication information in the first synchronization block group, a first frequency sub-band in which the first synchronization block group is located, and determine first frequency domain distribution information and first time domain distribution information of the first synchronization block group in the first frequency sub-band;

determine a second frequency sub-band in which a control resource set is located;

calculate a number of frequency sub-bands between the second frequency sub-band and the first frequency sub-band;

calculate, according to the number and a width of the frequency sub-band, a quantity of frequency domain offset of a second synchronization block group in the second frequency sub-band relative to the first synchronization block group;

determine according to the offset and the first frequency domain distribution information, second frequency domain distribution information of the second synchronization block group;

determine, according to the second frequency domain distribution information, the first time domain distribution information, and a preset time domain relationship and a preset frequency domain relationship between the second synchronization block group and the control resource set, frequency domain distribution information and time domain distribution information of the control resource set;

determine the control resource set according to the frequency domain distribution information of the control resource set and the time domain distribution information of the control resource set; and determine remaining key information according to control information in the control resource set.

According to a fourth aspect of embodiments of the present disclosure, there is provided a computer readable storage medium, thereon having stored a computer program, wherein the program implements following steps when executed by a processor:

receiving synchronization block groups in a frequency band in which information is transmitted, wherein the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

determining, when a first synchronization block group is received, according to indication information in the first synchronization block group, a first frequency sub-band in which the first synchronization block group is located, and determining first frequency domain distribution information and first time domain distribution information of the first synchronization block group in the first frequency sub-band;

determining a second frequency sub-band in which a control resource set is located;

calculating a number of frequency sub-bands between the second frequency sub-band and the first frequency sub-band;

calculating, according to the number and a width of the frequency sub-bands, a quantity of frequency domain offset of a second synchronization block group in the second frequency sub-band relative to the first synchronization block group;

determining, according to the offset and the first frequency domain distribution information, second frequency domain distribution information of the second synchronization block group;

determining, according to the second frequency domain distribution information, the first time domain distribution information, and a preset time domain relationship and a preset frequency domain relationship between the second synchronization block group and the control resource set, frequency domain distribution information and time domain distribution information of the control resource set;

determining the control resource set according to the frequency domain distribution information of the control resource set and the time domain distribution information of the control resource set; and determining remaining key information according to control information in the control resource set.

The technical solutions provided by embodiments of the present disclosure may include following beneficial effects.

According to the foregoing embodiments, the disclosure may divide a frequency band into a plurality of frequency sub-bands, and set a synchronization block group in each frequency sub-band, leading to that after receiving a synchronization block group in any frequency sub-band, a user equipment may determine remaining key information according to the synchronization block group, and it is not required to accept a synchronization block group in an entire frequency band, so that the remaining key information may be determined more quickly.

Moreover, only one control resource set may be set in the entire frequency band, and time domain distribution information of the control resource set and the frequency domain distribution information of the control resource set are determined according to a time domain relationship and a frequency domain relationship of the received synchronization block group and a control resource set, and time domain distribution information and frequency domain distribution information of the control resource set are not required to be concretely indicated by the indication information, so that bits occupied by the indication information may be reduced.

It should be understood that above general description and following detailed description are intended to be illustrative and not restrictive, which is not intended to limit the disclosure.

BRIEF DESCRIPTION OF THE DRAWINGS

In order to more clearly illustrate technical solutions in embodiments of the present disclosure, drawings used in the description of the embodiments will be briefly described below. Obviously, the drawings in the following description are only some of the embodiments of the present disclosure, and those skilled in the art may obtain other drawings according to the drawings without any inventive labor.

DETAILED DESCRIPTION

Exemplary embodiments will be illustrated in detail here, examples of which are expressed in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Instead, they are merely examples of devices and methods consistent with aspects of the disclosure as recited in the appended claims.

Figure 1:
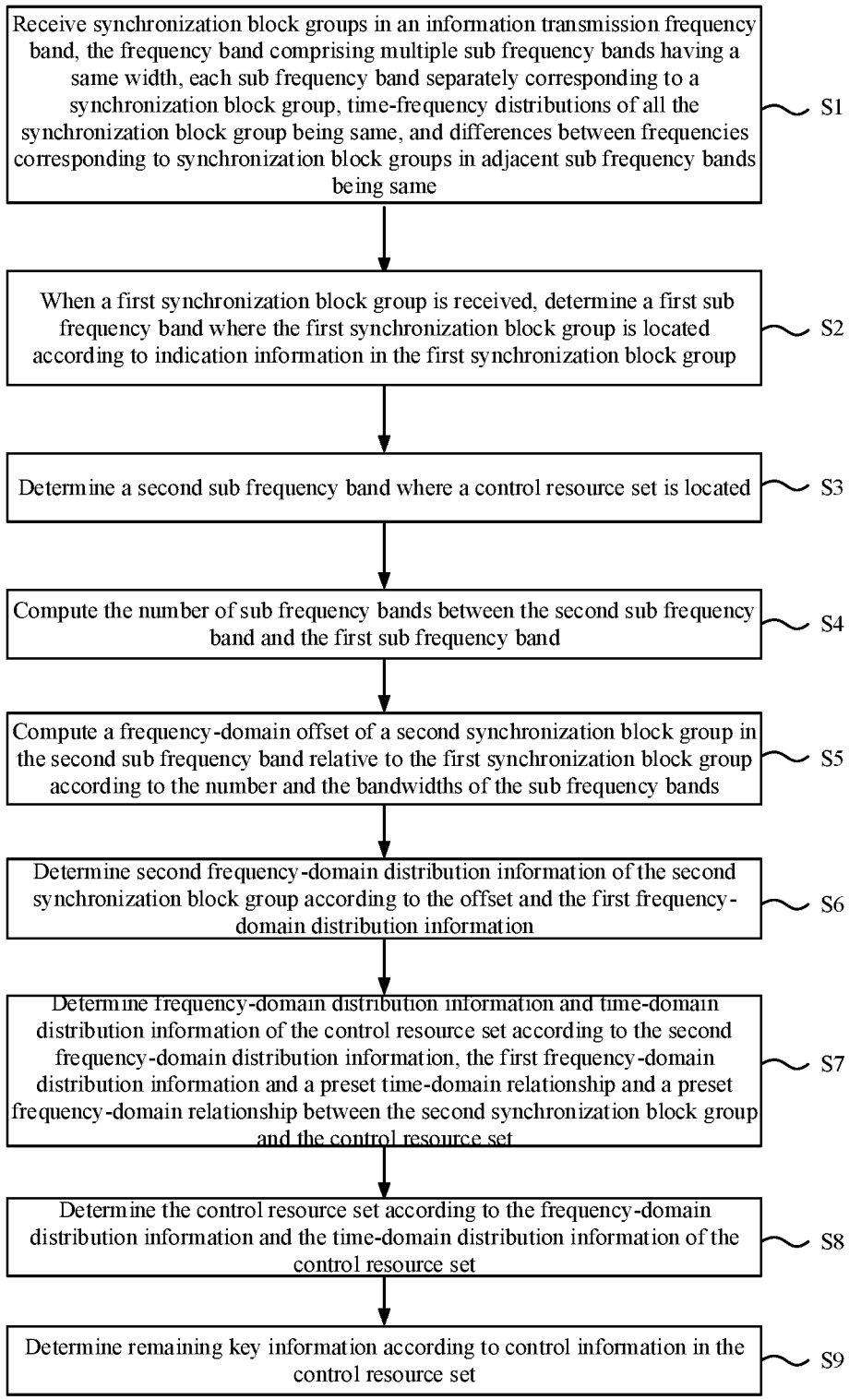
FIG. 1 is a schematic flowchart showing an information determining method according to an exemplary embodiment.

FIG. 1 is a schematic flowchart showing an information determining method according to an exemplary embodiment. The embodiment shown in FIG. 1 may be applied to a user equipment, where the user equipment may be a terminal such as a mobile phone or a tablet computer. As shown in FIG. 1, the information determining method may include the following steps.

In step S1, synchronization block groups in a frequency band in which information is transmitted are received, where the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

In an embodiment, the synchronization block groups may be transmitted by a 5G base station to a user equipment, and each synchronization block group may include a plurality of sets, and the sets may carry a PBCH (Physical Broadcast Channel), a SSS (Subsidiary Synchronization Signal), and a DMRS (Demodulation Reference Signal), and may also carry a PSS (Primary Synchronization Signal).

In an embodiment, the frequency band for transmitting information may be divided into a plurality of frequency sub-bands in advance, and the number of frequency sub-bands may be set as needed. For example, a width of the frequency band is 400 M, the frequency band may be divided into four frequency sub-bands, and each frequency sub-band has a width of 100 M; for example, a width of the frequency band width is 240 M, the frequency band may be divided into two frequency sub-bands, and each sub-band has a width of 120 M.

Figure 2:
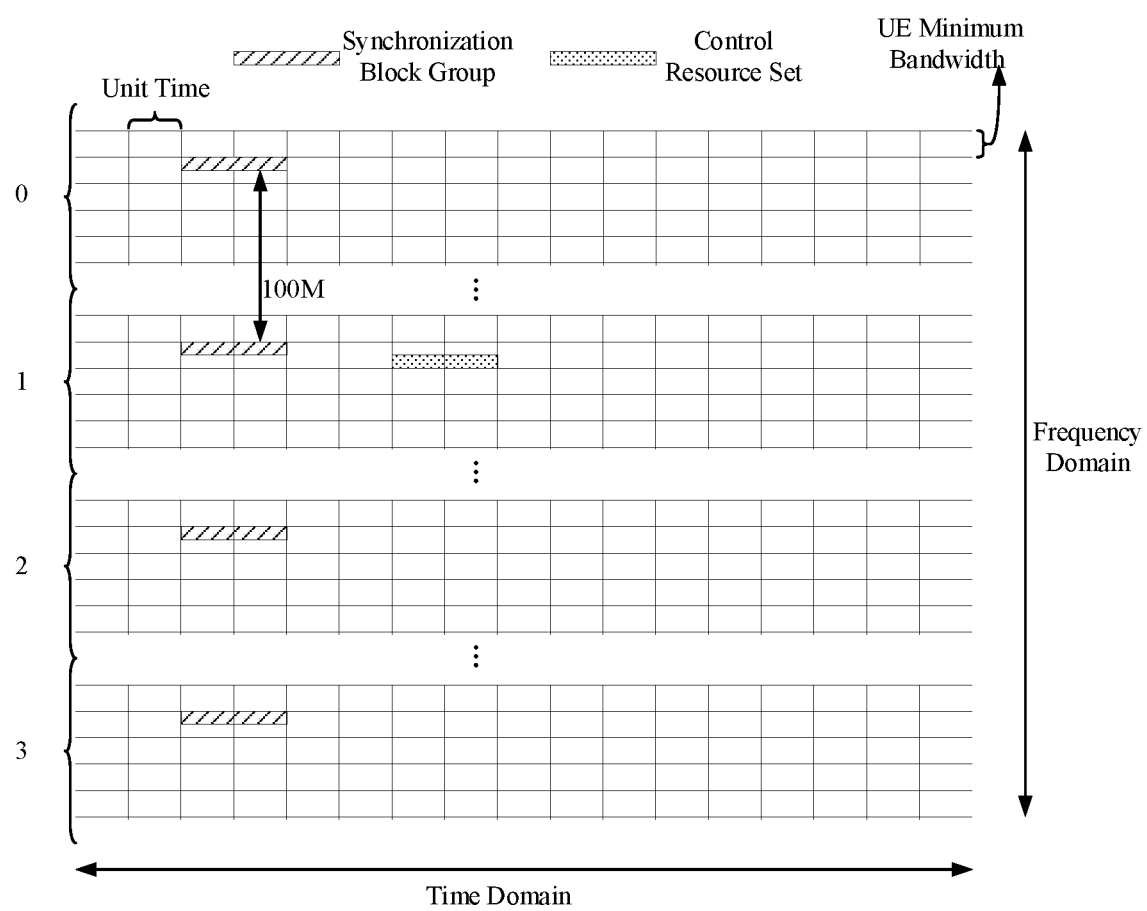
FIG. 2 is a schematic diagram showing a distribution of a synchronization block group and a control resource set according to an exemplary embodiment.

FIG. 2 is a schematic diagram showing a distribution of a synchronization block group and a control resource set according to an exemplary embodiment.

In an embodiment, as shown in FIG. 2, a width of the frequency band is 400 M, and the frequency band includes four frequency sub-bands having a width of 100 M. Since a width of a frequency band in 5G communication is not strictly limited, it may be set to be very wide. However, performances of different user equipment are different, and widths of supported frequency bands are also different, so a minimum width of the frequency band that all user equipment can support may be set, that is, the minimum width of frequency band in the UE shown in FIG. 2, and the synchronization block groups, the control resource set and the remaining key information. Moreover, paging information (Paging) are all set within the same minimum width of frequency band (where the remaining key information and the paging information are not shown in FIG. 2) to ensure that all user equipment is able to receive the synchronization block groups, the control resource set, the remaining key information and the paging information. Among them, a width of each frequency sub-band may be set as needed, but the width is greater than or equal to the minimum width of the frequency band in the UE. In addition, a second synchronization block group and the control resource set may have overlapping regions in a frequency domain, or may not have overlapping regions.

The differences of frequency corresponding to synchronization block groups in adjacent frequency sub-bands are all 100 M, which is the width of the frequency sub-band. Moreover, the synchronization block groups have a same distribution in the time domain (for example, they occupy a same unit time, and the unit time may be set as needed).

In step S2, when a first synchronization block group is received, according to indication information in the first synchronization block group, a first frequency sub-band in which the first synchronization block group is located is determined, and first frequency domain distribution information and first time domain distribution information of the first synchronization block group in the first frequency sub-band are determined.

In an embodiment, when receiving a signal transmitted by a 5G base station, a user equipment may receive a synchronization block group in any one of the frequency sub-bands, and each synchronization block group may respectively include indication information, where the indication information is used to indicate the frequency sub-band in which the synchronization block group is located. For example, a sequence number may be set for each frequency sub-band. For example, the sequence number of four frequency sub-bands in FIG. 2 is 0, 1, 2, and 3 from top to bottom respectively, and the indication information may be used to indicate the sequence number of the frequency sub-band in which the synchronization block group in which it is located, for example, the sequence number of the first frequency sub-band is 0.

The indication information may further indicate the first frequency domain distribution information and the first time domain distribution information of the first synchronization block group in the first frequency sub-band, and the time domain distribution of each synchronization block group is the same. Therefore, the first time domain distribution information is also the time domain distribution information of synchronization block groups in other frequency sub-bands.

In an embodiment, the first frequency domain distribution information and the first time domain distribution information of the first synchronization block group in the first frequency sub-band may not be only indicated by the indication information, but may also be preset. For example, the frequency domain distribution information and the time domain distribution information of the synchronization block group in each frequency sub-band in a corresponding frequency sub-band may be preset. For example, the frequency domain distribution information of the synchronization block group in the corresponding frequency sub-band may be preset as the synchronization block being located in the minimum bandwidth of frequency band in the first UE in the frequency sub-band, and the time domain distribution information may be preset as the synchronization block group occupying time of first two units in the frequency sub-band, in order to further reduce content of indication required for the indication information.

In step S3, a second frequency sub-band in which a control resource set is located is determined.

In step S4, a number of frequency sub-bands between the second frequency sub-band and the first frequency sub-band is calculated.

In step S5, according to the number and a width of the frequency sub-band, a quantity of frequency domain offset of the second synchronization block group in the second frequency sub-band relative to the first synchronization block group is calculated.

In an embodiment, only one control resource set may be set in the frequency band in which information is transmitted, and the control resource set may be located in a frequency sub-band, and one synchronization block group may exist in the frequency sub-band, where the time domain relationship and the frequency domain relationship between the control resource set and the synchronization block group are predetermined. Therefore, in order to determine the control resource set, a synchronization block group located in the same frequency sub-band as the control resource set, that is, the second synchronization block group, may be determined first.

After the second frequency sub-band in which the control resource set is located, and the first frequency sub-band in which the first synchronization block group is located are determined, the number of frequency sub-bands between the second frequency sub-band and the first frequency sub-band may be further. For example, as is shown in FIG. 2, the above number may be calculated according to the sequence number of the frequency sub-band, for example, the sequence number of the second frequency sub-band is 2, the sequence number of the first frequency sub-band is 1, then the number of the frequency band between the second frequency sub-band and the first frequency sub-band is 1. Since the differences of frequency corresponding to synchronization block groups in adjacent frequency sub-bands are the same, for example, they are all the width of the frequency sub-bands, 100 M, offset between the first synchronization block group and the second synchronization block group is calculated as 1×100 M according to the number and the width of the frequency sub-band, that is, the second synchronization block group in the same frequency sub-band as the control resource set has an offset of 100 M relative to the first synchronization block group received by the user equipment namely the frequency sub-band with a larger serial number.

It should be noted that the above number may be a negative number, and in the case where the number is a negative number, the offset is an offset to a sub-band having a smaller sequence number.

Among them, the second frequency sub-band in which the control resource set is located may be indicated by the indication information, or may be determined according to the information pre-stored in a user equipment.

In step S6, according to the offset and the first frequency domain distribution information, second frequency domain distribution information of the second synchronization block group is determined.

In an embodiment, since the offset is an offset in the frequency domain, the second frequency domain distribution information of the second set may be determined according to the offset and the first frequency domain distribution information. For example, the first frequency domain distribution information of the first synchronization block group is the 33 M to 34 M in the 400 M frequency band in which the first synchronization block group located, and then the second frequency domain distribution information of the second synchronization block group is the 133 M to 134 M in the 400 M frequency band in which the second synchronization block group located.

In step S7, according to the second frequency domain distribution information, the first time domain distribution information, and a preset time domain relationship and a preset frequency domain relationship between the second synchronization block group and the control resource set, frequency domain distribution information and time domain distribution information of the control resource set are determined.

In an embodiment, the time domain relationship and the frequency domain relationship between the control resource set and the second synchronization block group located in the same frequency sub-band as the control resource set are predetermined. Therefore, after the second frequency domain distribution information of the second synchronization block group is determined, the frequency domain distribution information of the control resource set may be determined according to the second frequency domain distribution information and the preset frequency domain relationship, and the frequency domain distribution information of the control resource set may be determined according to the first time domain distribution information of the second synchronization block group and the preset time domain relationship.

In step S8, the control resource set is determined according to the frequency domain distribution information of the control resource set and the time domain distribution information of the control resource set.

In step S9, remaining key information is determined according to control information in the control resource set.

In an embodiment, after the frequency domain distribution information of the control resource set and the time domain distribution information of the control resource set are determined, the control resource set may be determined according to the frequency domain distribution information and the time domain distribution information, and the control information is further obtained from the control resource set. And the remaining key information is determined according to the control information, so that a system information block may be acquired from the remaining key information for use in a process such as random access.

Based on the embodiment shown in FIG. 1, one frequency band may be divided into a plurality of frequency sub-bands, and one synchronization block group is respectively set in each frequency sub-band, leading to that after receiving the synchronization block group in any one of the frequency sub-bands, a user equipment may determine remaining key information according to the synchronization block group, and it is not required to accept a synchronization block group in the entire frequency band, so that the remaining key information may be determined more quickly.

Moreover, only one control resource set may be set in the entire frequency band, and time domain distribution information of the control resource set and the frequency domain distribution information of the control resource set are determined according to a time domain relationship and a frequency domain relationship of the received synchronization block group and a control resource set, and the time domain distribution information and the frequency domain distribution information of the control resource set are not required to be concretely indicated by the indication information, so that bits occupied by the indication information may be reduced.

Optionally, the first synchronization block group carries a physical broadcast channel;

where the physical broadcast channel carries the indication information.

In an embodiment, the indication information may be carried by a Physical Broadcast Channel (PBCH) carried by the first synchronization block group. For example, the indication information may be used to indicate the first frequency sub-band in which the first synchronization block group is located, and may also indicate the first frequency domain distribution information and the first time domain distribution information of the first synchronization block group in the first frequency sub-band. Among them, the indication information may specifically be used to indicate the sequence number of the first frequency sub-band in which the first synchronization block group is located, for example, the sequence number of the frequency sub-band is from 0 to 3 as shown in FIG. 2, then 2 bits in the PBCH may be used to indicate the sequence number.

Optionally, the first synchronization block group carries a demodulation reference signal;

where an orthogonal scrambling code of the demodulation reference signal is the indication information.

In an embodiment, the orthogonal scrambling code of the demodulation reference signal carried by the first synchronization block group may be used as the indication information.

Among them, if the sequence number of the first frequency sub-band in which the first synchronization block group is located is indicated through the indication information, the orthogonal scrambling code corresponding to the number of the frequency sub-bands may be set. For example, there are 4 frequency sub-bands, and the orthogonal scrambling code may be 2 bits, including four types as 00, 01, 10, and 11, representing sequence numbers of 0, 1, 2, and 3, respectively.

Figure 3:
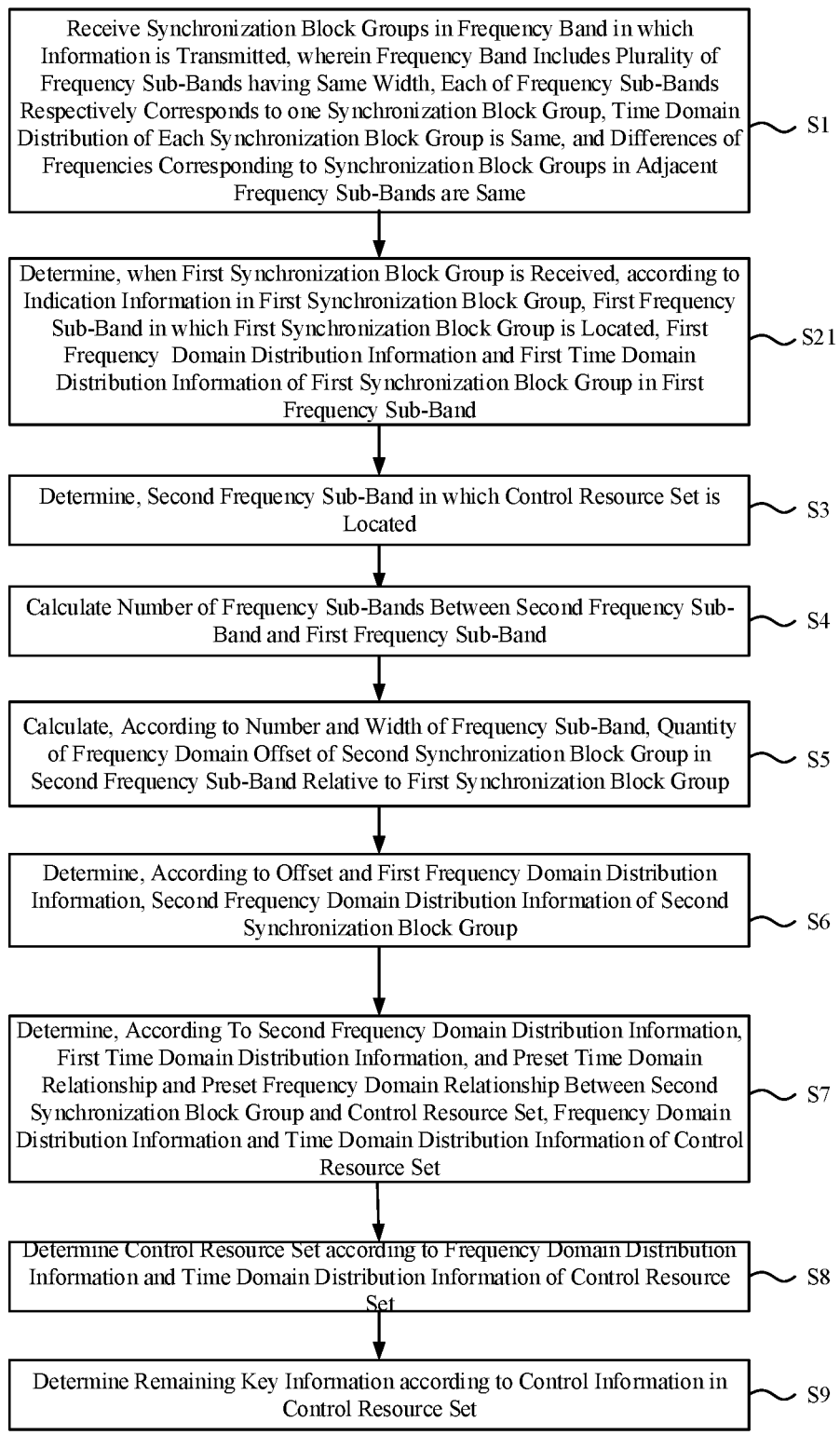
FIG. 3 is a schematic flowchart showing another information determining method according to an exemplary embodiment.

FIG. 3 is a schematic flowchart showing another information determining method according to an exemplary embodiment. As is shown in FIG. 3, on the basis of the embodiment shown in FIG. 1, the determining the first frequency domain distribution information and the first time domain distribution information of the first synchronization block group in the first frequency sub-band includes:

In step S21, according to the indication information, the first frequency domain distribution information and the first time domain distribution information of the first synchronization block group in the first frequency sub-band are determined.

In an embodiment, the first frequency sub-band in which the first synchronization block group is located, and the first frequency domain distribution information and the first time domain distribution information of the first synchronization block group in the first sub-band may be indicated by the indication information. In this case, the first frequency domain distribution information and the first time domain distribution information of the first synchronization block group in the first sub-band may be flexibly set according to requirements, and a user equipment is notified through the indication information.

Figure 4:
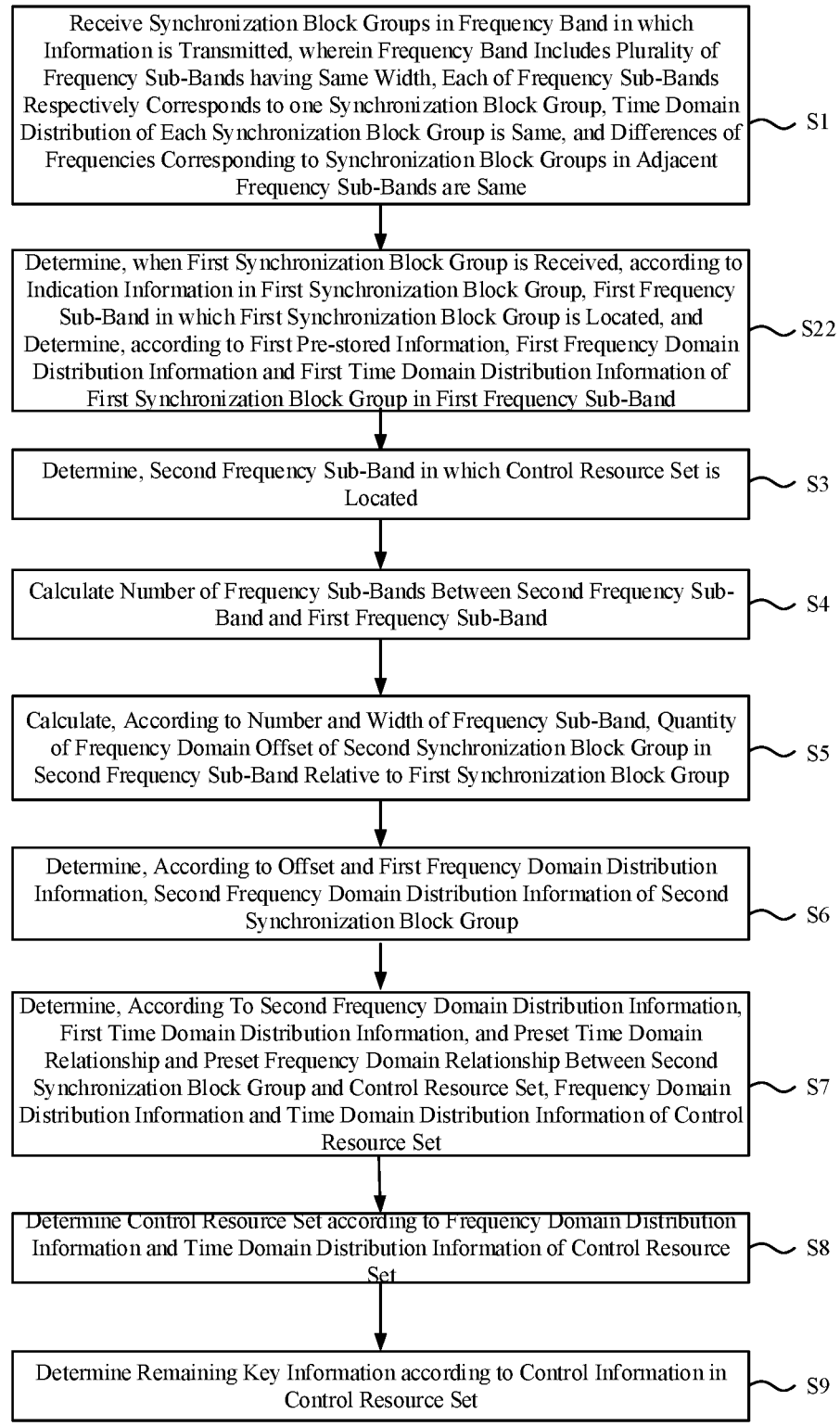
FIG. 4 is a schematic flowchart showing another information determining method according to an exemplary embodiment.

FIG. 4 is a schematic flowchart showing another information determining method according to an exemplary embodiment. As is shown in FIG. 4, on the basis of the embodiment shown in FIG. 1, the determining the first frequency domain distribution information and the first time domain distribution information of the first synchronization block group in the first frequency sub-band includes:

In step S22, according to first pre-stored information, the first frequency domain distribution information and the first time domain distribution information of the first synchronization block group in the first frequency sub-band are determined.

In an embodiment, the indication information may be only used to indicate the first frequency sub-band in which the first synchronization block group is located. In this case, content that the indication information needs to indicate is relatively little, which may reduce bits occupied by the indication information.

For example, for the case where the indication information is carried by the physical broadcast channel carried by the first synchronization block group, since the bits of the physical broadcast channel are very limited, according to the present embodiment, the physical broadcast channel may be enabled to carry more other information; for example, for the case where the orthogonal scrambling codes of the demodulation reference signal carried by the first synchronization block group are used as the indication information, since a user equipment takes a relatively long time to parse to obtain the demodulation reference in the case that the orthogonal scrambling codes are relatively a lot. Base on the present embodiment a number of orthogonal scrambling codes may be reduced, and time for the user equipment to parse a demodulated reference signal may be shortened.

Figure 5:
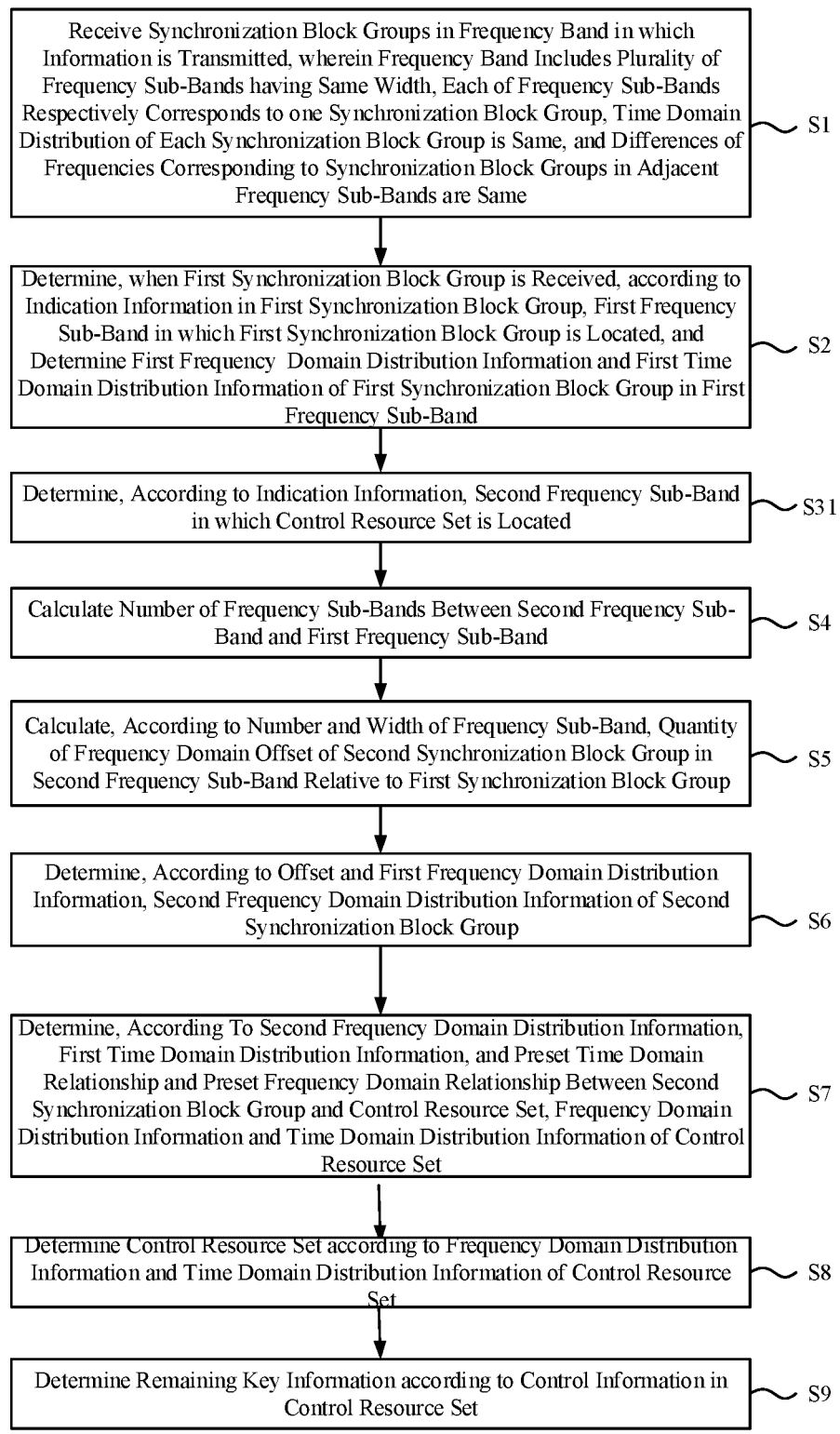
FIG. 5 is a schematic flowchart showing another information determining method according to an exemplary embodiment.

FIG. 5 is a schematic flowchart showing another information determining method according to an exemplary embodiment. As is shown in FIG. 5, on the basis of the embodiment shown in FIG. 1, the determining the second frequency sub-band in which the control resource set is located includes:

In step S31, according to the indication information, the second frequency sub-band in which the control resource set is located is determined.

In an embodiment, the indication information may also be used to indicate the second frequency sub-band in which the control resource set is located. In this case, the frequency sub-band in which the control resource set is located may be flexibly set according to requirements, and a user equipment is notified through the indication information.

Figure 6:
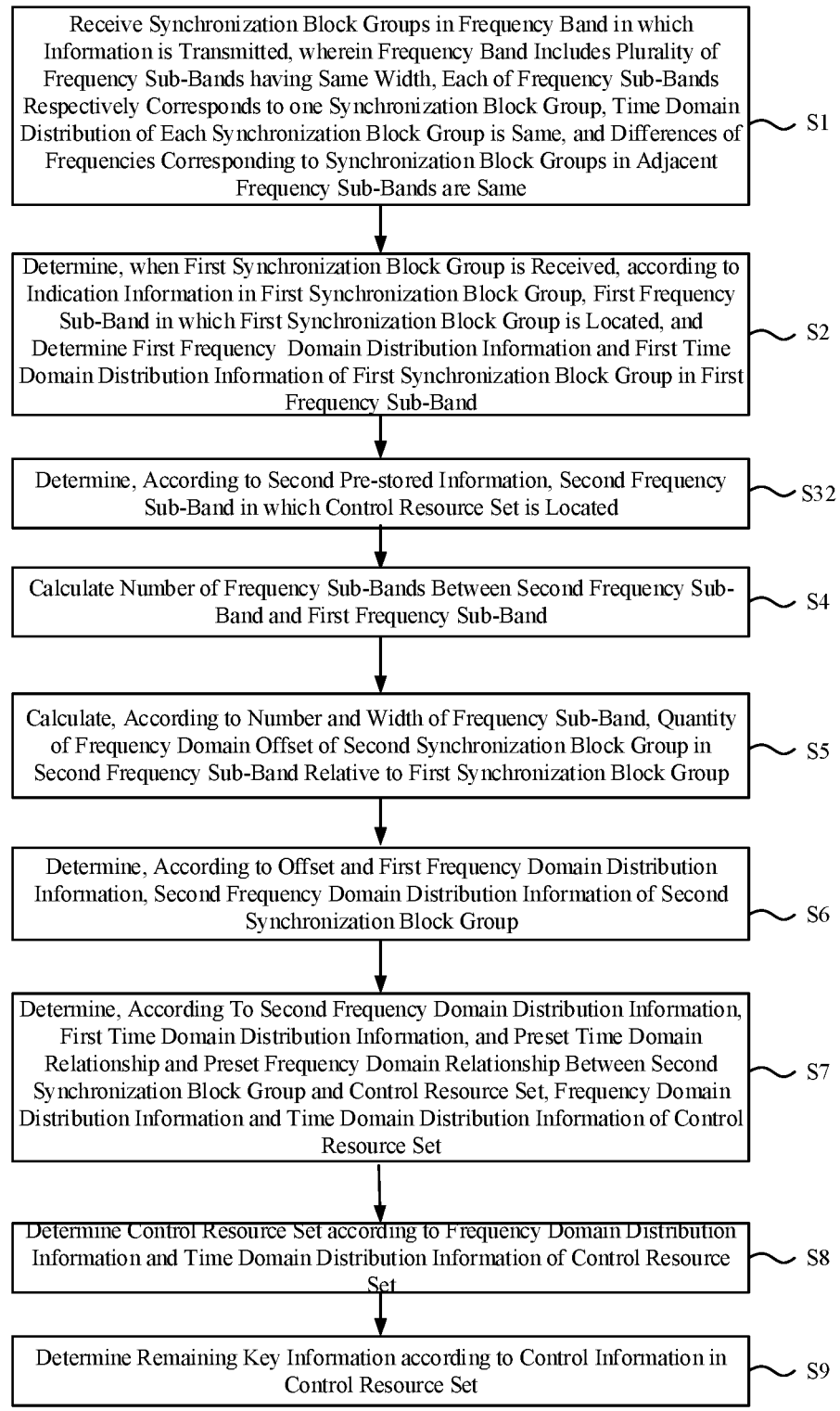
FIG. 6 is a schematic flowchart showing another information determining method according to an exemplary embodiment.

FIG. 6 is a schematic flowchart showing another information determining method according to an exemplary embodiment. As is shown in FIG. 6, on the basis of the embodiment shown in FIG. 1, the determining the second frequency sub-band in which the control resource set is located includes:

In step S32, according to second pre-stored information, the second frequency sub-band in which the control resource set is located is determined.

In an embodiment, the second frequency sub-band in which the control resource set is located may be determined by pre-stored information, so that the second frequency sub-band in which the control resource set is located need not be indicated through the indication information. In this case, content that the indication information needs to indicate is relatively little, which may reduce bits occupied by the indication information.

For example, for the case where the indication information is carried by the physical broadcast channel carried by the first synchronization block group, since the bits of the physical broadcast channel are very limited, according to the present embodiment, the physical broadcast channel may be enabled to carry more other information; for example, for the case where the orthogonal scrambling codes of the demodulation reference signal carried by the first synchronization block group are used as the indication information, since a user equipment takes a relatively long time to parse to obtain the demodulation reference in the case that the orthogonal scrambling codes are relatively a lot. Base on the present embodiment, a number of orthogonal scrambling codes may be reduced, and time for the user equipment to parse a demodulated reference signal may be shortened.

Corresponding to the foregoing embodiments of the information determining method, the present disclosure also provides embodiments of the information determining apparatus.

Figure 7:
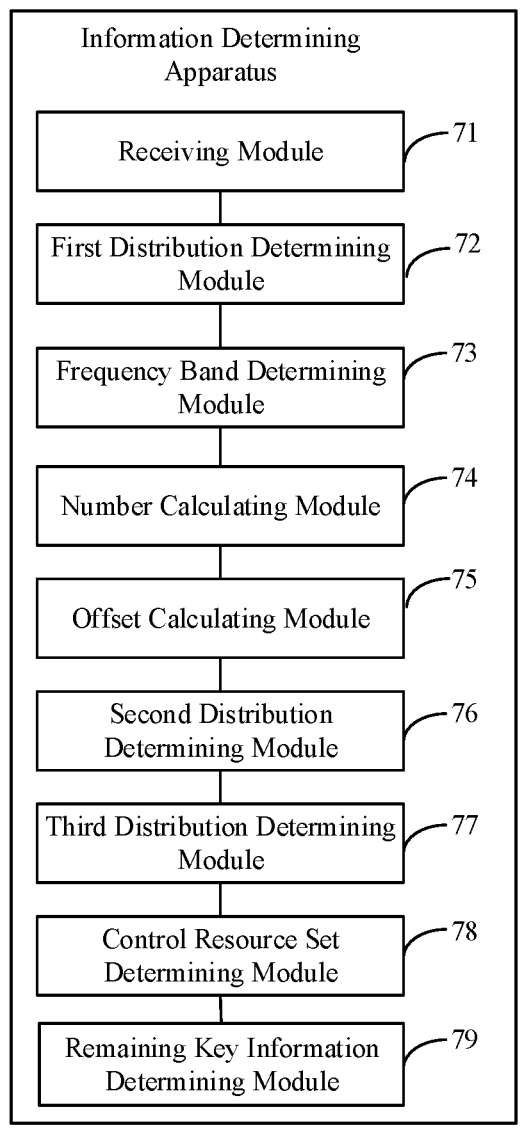
FIG. 7 is a schematic block diagram showing an information determining apparatus according to an exemplary embodiment.

FIG. 7 is a schematic block diagram showing an information determining apparatus according to an exemplary embodiment. As is shown in FIG. 57, the information determining apparatus includes:

a receiving module 71, configured to receive synchronization block groups in a frequency band in which information is transmitted, where the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

a first distribution determining module 72, configured to determine, when a first synchronization block group is received, according to indication information in the first synchronization block group, a first frequency sub-band in which the first synchronization block group is located, and determine first frequency domain distribution information and first time domain distribution information of the first synchronization block group in the first frequency sub-band;

a frequency band determining module 73, configured to determine a second frequency sub-band in which a control resource set is located;

a number calculating module 74, configured to calculate a number of frequency sub-bands between the second frequency sub-band and the first frequency sub-band;

an offset calculating module 75, configured to calculate, according to the number and a width of the frequency sub-bands, a quantity of frequency domain offset of a second synchronization block group in the second frequency sub-band relative to the first synchronization block group;

a second distribution determining module 76, configured to determine, according to the offset and the first frequency domain distribution information, second frequency domain distribution information of the second synchronization block group;

a third distribution determining module 77, configured to determine, according to the second frequency domain distribution information, the first time domain distribution information, and a preset time domain relationship and a preset frequency domain relationship between the second synchronization block group and the control resource set, frequency domain distribution information and time domain distribution information of the control resource set;

a control resource set determining module 78, configured to determine the control resource set according to the frequency domain distribution information of the control resource set and the time domain distribution information of the control resource set; and a remaining key information determining module 79, configured to determine remaining key information according to control information in the control resource set.

Optionally, the first synchronization block group carries a physical broadcast channel;

where the physical broadcast channel carries the indication information.

Optionally, the first synchronization block group carries a demodulation reference signal;

where an orthogonal scrambling code of the demodulation reference signal is the indication information.

Optionally, the first distribution determining module is configured to determine, according to the indication information, the first frequency domain distribution information and the first time domain distribution information of the first synchronization block group in the first frequency sub-band.

Optionally, the first distribution determining module is configured to determine, according to first pre-stored information, the first frequency domain distribution information and the first time domain distribution information of the first synchronization block group in the first frequency sub-band.

Optionally, the frequency band determining module is configured to determine, according to the indication information, the second frequency sub-band in which the control resource set is located.

Optionally, the frequency band determining module is configured to determine, according to second pre-stored information, the second frequency sub-band in which the control resource set is located.

With regard to the apparatus in the above embodiments, the specific manner in which the respective modules perform the operations has been described in detail in the embodiments of related methods, and will not be described in detail herein.

For the apparatus embodiments, since they basically correspond to the method embodiments, reference may be made to partial descriptions of the method embodiments. The apparatus embodiments described above are merely illustrative, where the modules described as separate components may or may not be physically separate, and the components displayed as modules may or may not be physical modules, that is, they may be located in one place, or they may be distributed to a plurality of network modules. Part or all of the modules may be selected according to actual needs to achieve purposes of the present disclosure. Those skilled in the art may understand and implement without any creative efforts.

Embodiments of the present disclosure also provide an electronic device, including:

a processor; and a memory configured to store instructions executable by the processor, wherein the processor is configured to:

receive synchronization block groups in a frequency band in which information is transmitted, wherein the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

determine, when a first synchronization block group is received, according to indication information in the first synchronization block group, a first frequency sub-band in which the first synchronization block group is located, and determine first frequency domain distribution information and first time domain distribution information of the first synchronization block group in the first frequency sub-band;

determine a second frequency sub-band in which a control resource set is located;

calculate a number of frequency sub-bands between the second frequency sub-band and the first frequency sub-band;

calculate, according to the number and a width of the frequency sub-band, a quantity of frequency domain offset of a second synchronization block group in the second frequency sub-band relative to the first synchronization block group;

determine according to the offset and the first frequency domain distribution information, second frequency domain distribution information of the second synchronization block group;

determine, according to the second frequency domain distribution information, the first time domain distribution information, and a preset time domain relationship and a preset frequency domain relationship between the second synchronization block group and the control resource set, frequency domain distribution information and time domain distribution information of the control resource set;

determine the control resource set according to the frequency domain distribution information of the control resource set and the time domain distribution information of the control resource set; and determine remaining key information according to control information in the control resource set.

Embodiments of the present disclosure also provide a computer readable storage medium, thereon having stored a computer program, wherein the program implements following steps when executed by a processor:

receiving synchronization block groups in a frequency band in which information is transmitted, wherein the frequency band includes a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

determining, when a first synchronization block group is received, according to indication information in the first synchronization block group, a first frequency sub-band in which the first synchronization block group is located, and determining first frequency domain distribution information and first time domain distribution information of the first synchronization block group in the first frequency sub-band;

determining a second frequency sub-band in which a control resource set is located;

calculating a number of frequency sub-bands between the second frequency sub-band and the first frequency sub-band;

calculating, according to the number and a width of the frequency sub-bands, a quantity of frequency domain offset of a second synchronization block group in the second frequency sub-band relative to the first synchronization block group;

determining, according to the offset and the first frequency domain distribution information, second frequency domain distribution information of the second synchronization block group;

determining, according to the second frequency domain distribution information, the first time domain distribution information, and a preset time domain relationship and a preset frequency domain relationship between the second synchronization block group and the control resource set, frequency domain distribution information and time domain distribution information of the control resource set;

determining the control resource set according to the frequency domain distribution information of the control resource set and the time domain distribution information of the control resource set; and determining remaining key information according to control information in the control resource set.

Figure 8:
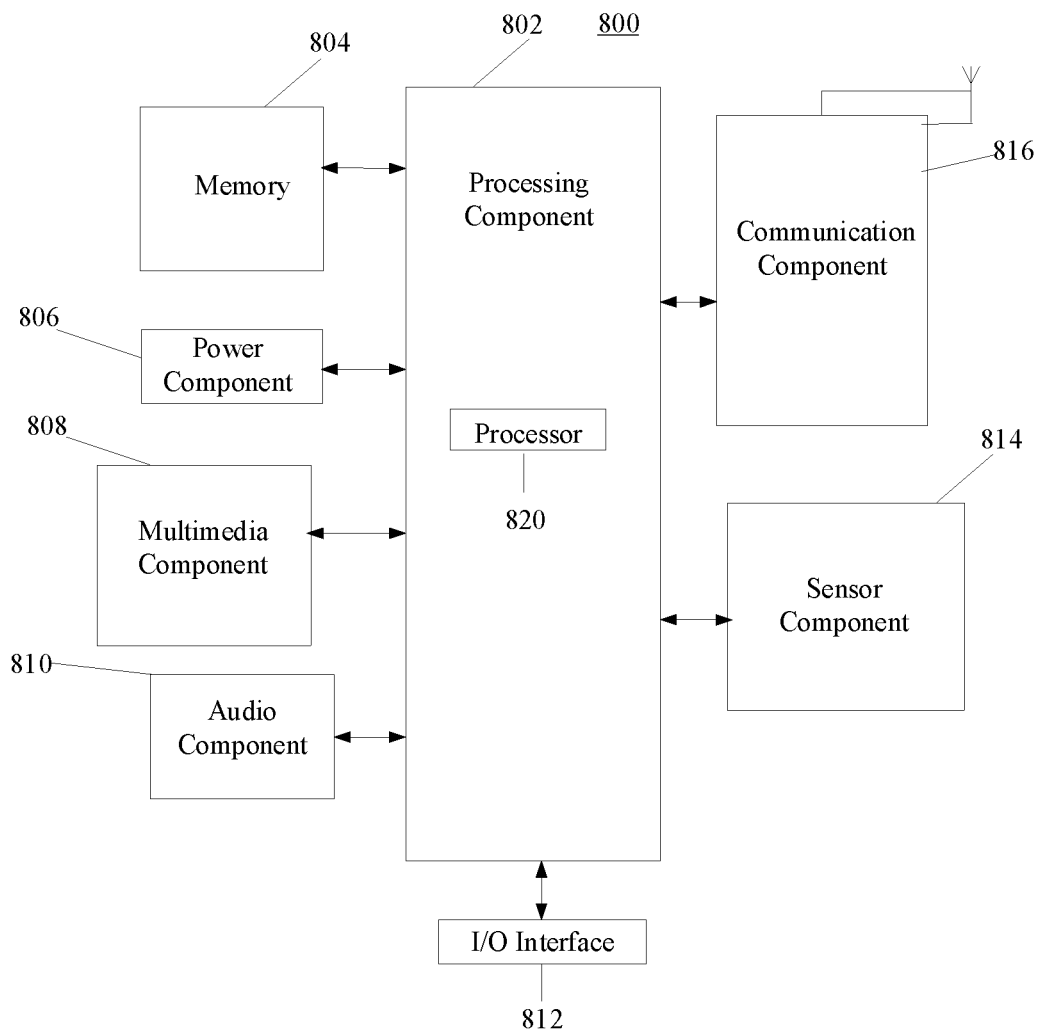
FIG. 8 is a schematic block diagram showing an apparatus used for determining information according to an exemplary embodiment.

FIG. 8 is a schematic block diagram showing an apparatus used for information determining according to an exemplary embodiment. For example, the terminal device 800 may be a mobile phone, a computer, a digital broadcast terminal, a messaging receiving and/or sending device, a game console, a tablet device, a medical device, a fitness device, a personal digital assistant, and the like.

Referring to FIG. 8, the terminal device 800 may include one or more of following components: a processing component 802, a memory 804, a power component 806, a multimedia component 808, an audio component 810, an input/output (I/O) interface 812, a sensor component 814 and a communication component 816.

The processing component 802 typically controls overall operations of the terminal device 800, such as operations associated with display, telephone calls, data communications, camera operations and recording operations. The processing component 802 may include one or more processors 820 to execute instructions to perform all or part of the steps of the methods described above. Moreover, the processing component 802 may include one or more modules to facilitate interactions between the processing component 802 and other components. For example, the processing component 802 may include a multimedia module to facilitate interactions between the multimedia component 808 and the processing component 802.

The memory 804 is configured to store various types of data to support operations on the terminal device 800. Examples of such data include instructions of any application or method operated on the terminal device 800, contact data, phone book data, messages, pictures, videos, and the like. The memory 804 may be implemented by any type of volatile or non-volatile storage devices, or a combination thereof, which may be such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a disk or an optical disk.

The power component 806 provides power to various components of the terminal device 800. The power component 806 may include a power management system, one or more power sources, and other components associated with generating, managing, and distributing power for the terminal device 800.

The multimedia component 808 includes a screen that provides an output interface between the terminal device 800 and a user. In some embodiments, the screen may include a Liquid Crystal Display (LCD) and a Touch Panel (TP). If the screen includes a touch panel, the screen may be implemented as a touch screen to receive input signals from a user. The touch panel includes one or more touch sensors to sense touches, slides, and gestures on the touch panel. The touch sensor may not only sense a boundary of a touch or sliding action, but also detect duration and pressure associated with the touch or slide operation. In some embodiments, the multimedia component 808 includes a front camera and/or a rear camera. When the terminal device 800 is in an operation mode, such as a shooting mode or a video mode, the front camera and/or the rear camera may receive external multimedia data. Each front camera and each rear camera may be a fixed optical lens system or have focal length and optical zoom capability.

The audio component 810 is configured to output and/or input audio signals. For example, the audio component 810 includes a microphone (MIC), and when the terminal device 800 is in an operational mode, such as a call mode, a recording mode, or a voice recognition mode, the microphone is configured to receive external audio signals. The received audio signal may be further stored in the memory 804 or sent via the communication component 816. In some embodiments, the audio component 810 further includes a speaker for outputting audio signals.

The I/O interface 812 provides an interface between the processing component 802 and a peripheral interface module which may be a keyboard, a click wheel, a button, and the like. These buttons may include, but are not limited to, a home button, a volume button, a start button and a lock button.

The sensor assembly 814 includes one or more sensors used for providing a status assessment of various aspects for the terminal device 800. For example, the sensor component 814 may detect an open/closed state of the terminal device 800, a relative positioning of components, such as a display and keypad of the terminal device 800. The sensor component 814 may further detect a position change of the terminal device 800 or one component of the terminal device 800, presence or absence of contact of the user with the terminal device 800, azimuth or acceleration/deceleration of the terminal device 800 and temperature changes of the terminal device 800. The sensor component 814 may include a proximity sensor, configured to detect presence of nearby objects without any physical contact. The sensor component 814 may further include a light sensor, such as a CMOS or CCD image sensor, for use in imaging applications. In some embodiments, the sensor component 814 may further include an acceleration sensor, a gyro sensor, a magnetic sensor, a pressure sensor or a temperature sensor.

The communication component 816 is configured to facilitate wired or wireless communication between the terminal device 800 and other devices. The terminal device 800 may access a wireless network based on a communication standard such as Wi-Fi, 2G or 3G, or a combination thereof. In an exemplary embodiment, the communication component 816 receives broadcast signals or information about broadcast from an external broadcast management system through a broadcast channel. In an exemplary embodiment, the communication component 816 further includes a Near Field Communication (NFC) module to facilitate short range communication. For example, the NFC module may be implemented based on Radio Frequency IDentification (RFID) technology, Infrared Data Association (IrDA) technology, Ultra-WideBand (UWB) technology, BlueTooth (BT) technology and other technologies.

In an exemplary embodiment, the terminal device 800 may be implemented by one or more Application Specific Integrated Circuits (ASICs), Digital Signal Processors (DSP), Digital Signal Processing Devices (DSPD), Programmable Logic Devices (PLD), Field Programmable Gate Arrays (FPGA), controllers, microcontrollers, microprocessors, or other electronic components, for performing the methods in the embodiments described above.

In an exemplary embodiment, there is further provided a non-transitory computer readable storage medium including instructions, such as the memory 804 including instructions, and the instructions may be executed by the processor 820 of the terminal device 800 to perform the above method. For example, the non-transitory computer readable storage medium may be a ROM, a Random-Access Memory (RAM), a CD-ROM, a magnetic tape, a floppy disk, an optical data storage device, and the like.

Other embodiments of the disclosure will be apparent to those skilled in the art from consideration of the specification and practice of the disclosure disclosed here. This application is intended to cover any variations, uses, or adaptations of the disclosure, the variations, uses, or adaptations following general principles thereof and including common sense or customary practice in the art which are not disclosed in the present disclosure. It is intended that the specification and examples are considered as exemplary only, with a true scope and spirit of the disclosure being indicated by the following claims.

It will be appreciated that the present disclosure is not limited to the exact construction that has been described above and illustrated in the accompanying drawings, and various modifications and changes may be made without departing from the scope thereof. It is intended that the scope of the disclosure only be limited by the appended claims.

It should be noted that, in the context, relational terms such as first and second are used merely to distinguish one entity or operation from another entity or operation, and it does not necessarily require or imply any such actual relationship or order between these entities or operations. The terms "including," "comprising," or any other variant thereof are intended to encompass a non-exclusive inclusion, such that a process, method, article, or device that comprises a plurality of elements includes not only those elements but also those are not explicitly listed, or elements that are inherent to such a process, method, article, or device. In the case without more limitations, an element that is defined by the phrase "including a . . . " does not exclude presence of additional equivalent elements in the process, method, item, or device that includes the element.

The invention claimed is:

1. An information determining method, comprising:
receiving synchronization block groups in a frequency band in which information is transmitted, wherein the frequency band comprises a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;
determining, when a first synchronization block group is received, according to indication information in the first synchronization block group, a first frequency sub-band in which the first synchronization block group is located, and determining first frequency domain distribution information and first time domain distribution information of the first synchronization block group in the first frequency sub-band;
determining a second frequency sub-band in which a control resource set is located;
calculating a number of frequency sub-bands between the second frequency sub-band and the first frequency sub-band;
calculating, according to the number and a width of the frequency sub-bands, a quantity of frequency domain offset of a second synchronization block group in the second frequency sub-band relative to the first synchronization block group;
determining, according to the offset and the first frequency domain distribution information, second frequency domain distribution information of the second synchronization block group;
determining, according to the second frequency domain distribution information, the first time domain distribution information, and a preset time domain relationship and a preset frequency domain relationship between the second synchronization block group and the control resource set, frequency domain distribution information and time domain distribution information of the control resource set;
determining the control resource set according to the frequency domain distribution information of the control resource set and the time domain distribution information of the control resource set; and
determining remaining key information according to control information in the control resource set.

2. The method according to claim 1, wherein the first synchronization block group carries a physical broadcast channel;
wherein the physical broadcast channel carries the indication information.

3. The method according to claim 1, wherein the first synchronization block group carries a demodulation reference signal;
wherein an orthogonal scrambling code of the demodulation reference signal is the indication information.

4. The method according to claim 1, wherein the determining the first frequency domain distribution information and the first time domain distribution information of the first synchronization block group in the first frequency sub-band comprises:
determining, according to the indication information, the first frequency domain distribution information and the first time domain distribution information of the first synchronization block group in the first frequency sub-band.

5. The method according to claim 1, wherein the determining the first frequency domain distribution information and the first time domain distribution information of the first synchronization block group in the first frequency sub-band comprises:
determining, according to first pre-stored information, the first frequency domain distribution information and the first time domain distribution information of the first synchronization block group in the first frequency sub-band.

6. The method according to claim 1, wherein the determining the second frequency sub-band in which the control resource set is located comprises:
determining, according to the indication information, the second frequency sub-band in which the control resource set is located.

7. The method according to claim 1, wherein the determining the second frequency sub-band in which the control resource set is located comprises:
determining, according to second pre-stored information, the second frequency sub-band in which the control resource set is located.

8. The method according to claim 2, wherein the determining the first frequency domain distribution information and the first time domain distribution information of the first synchronization block group in the first frequency sub-band comprises:
determining, according to the indication information, the first frequency domain distribution information and the first time domain distribution information of the first synchronization block group in the first frequency sub-band.

9. The method according to claim 3, wherein the determining the first frequency domain distribution information and the first time domain distribution information of the first synchronization block group in the first frequency sub-band comprises:
determining, according to the indication information, the first frequency domain distribution information and the first time domain distribution information of the first synchronization block group in the first frequency sub-band.

10. The method according to claim 2, wherein the determining the first frequency domain distribution information and the first time domain distribution information of the first synchronization block group in the first frequency sub-band comprises:
determining, according to first pre-stored information, the first frequency domain distribution information and the first time domain distribution information of the first synchronization block group in the first frequency sub-band.

11. The method according to claim 3, wherein the determining the first frequency domain distribution information and the first time domain distribution information of the first synchronization block group in the first frequency sub-band comprises:
determining, according to first pre-stored information, the first frequency domain distribution information and the first time domain distribution information of the first synchronization block group in the first frequency sub-band.

12. The method according to claim 2, wherein the determining the second frequency sub-band in which the control resource set is located comprises:
determining, according to the indication information, the second frequency sub-band in which the control resource set is located.

13. The method according to claim 3, wherein the determining the second frequency sub-band in which the control resource set is located comprises:
determining, according to the indication information, the second frequency sub-band in which the control resource set is located.

14. The method according to claim 2, wherein the determining the second frequency sub-band in which the control resource set is located comprises:
determining, according to second pre-stored information, the second frequency sub-band in which the control resource set is located.

15. A communication system implementing the method according to claim 1, comprising a 5G base station and user equipment (UE), wherein
the UE is configured to determine, after receiving a synchronization block group in any frequency sub-band, remaining key information according to the synchronization block group, without accepting a synchronization block group in an entire frequency band, so as to determine the remaining key information more quickly; and
only one control resource set is set in the entire frequency band, and time domain distribution information of the control resource set and the frequency domain distribution information of the control resource set are determined according to a time domain relationship and a frequency domain relationship of the received synchronization block group and a control resource set, without specifically indicating time domain distribution information and frequency domain distribution information of the control resource set by the indication information, so as to reduce bits occupied by the indication information.

16. An electronic device, comprising:
a processor; and
a memory configured to store instructions executable by the processor,
wherein the processor is configured to:
receive synchronization block groups in a frequency band in which information is transmitted, wherein the frequency band comprises a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;
determine, when a first synchronization block group is received, according to indication information in the first synchronization block group, a first frequency sub-band in which the first synchronization block group is located, and determine first frequency domain distribution information and first time domain distribution information of the first synchronization block group in the first frequency sub-band;
determine a second frequency sub-band in which a control resource set is located;

calculate a number of frequency sub-bands between the second frequency sub-band and the first frequency sub-band;

calculate, according to the number and a width of the frequency sub-band, a quantity of frequency domain offset of a second synchronization block group in the second frequency sub-band relative to the first synchronization block group;

determine according to the offset and the first frequency domain distribution information, second frequency domain distribution information of the second synchronization block group;

determine, according to the second frequency domain distribution information, the first time domain distribution information, and a preset time domain relationship and a preset frequency domain relationship between the second synchronization block group and the control resource set, frequency domain distribution information and time domain distribution information of the control resource set;

determine the control resource set according to the frequency domain distribution information of the control resource set and the time domain distribution information of the control resource set; and determine remaining key information according to control information in the control resource set.

17. The electronic device according to claim 16, wherein the first synchronization block group carries a physical broadcast channel; and
wherein the physical broadcast channel carries the indication information.

18. The electronic device according to claim 16, wherein the first synchronization block group carries a demodulation reference signal; and
wherein an orthogonal scrambling code of the demodulation reference signal is the indication information.

19. The electronic device according to claim 16, wherein the processor is further configured to determine, according to the indication information, the first frequency domain distribution information and the first time domain distribution information of the first synchronization block group in the first frequency sub-band.

20. A non-transitory computer readable storage medium, thereon having stored a computer program, wherein the program implements following steps when executed by a processor:

receiving synchronization block groups in a frequency band in which information is transmitted, wherein the frequency band comprises a plurality of frequency sub-bands having a same width, each of the frequency sub-bands respectively corresponds to one synchronization block group, a time domain distribution of each synchronization block group is the same, and differences of frequencies corresponding to synchronization block groups in adjacent frequency sub-bands are the same;

determining, when a first synchronization block group is received, according to indication information in the first synchronization block group, a first frequency sub-band in which the first synchronization block group is located, and determining first frequency domain distribution information and first time domain distribution information of the first synchronization block group in the first frequency sub-band;

determining a second frequency sub-band in which a control resource set is located;

calculating a number of frequency sub-bands between the second frequency sub-band and the first frequency sub-band;

calculating, according to the number and a width of the frequency sub-bands, a quantity of frequency domain offset of a second synchronization block group in the second frequency sub-band relative to the first synchronization block group;

determining, according to the offset and the first frequency domain distribution information, second frequency domain distribution information of the second synchronization block group;

determining, according to the second frequency domain distribution information, the first time domain distribution information, and a preset time domain relationship and a preset frequency domain relationship between the second synchronization block group and the control resource set, frequency domain distribution information and time domain distribution information of the control resource set;

determining the control resource set according to the frequency domain distribution information of the control resource set and the time domain distribution information of the control resource set; and determining remaining key information according to control information in the control resource set.

* * * * *